United States Patent [19]

Carroll et al.

[11] Patent Number: 4,960,862

[45] Date of Patent: Oct. 2, 1990

[54] REGENERATION OF METALLO-ORGANIC CATALYST FOR CARBON DIOXIDE-EPOXIDE COPOLYMERIZATION

[75] Inventors: W. Eamon Carroll, Orefield; Stephen A. Motika, Kutztown, both of Pa.

[73] Assignee: Air Products and Chemicals, Inc., Allentown, Pa.

[21] Appl. No.: 331,461

[22] Filed: Mar. 31, 1989

[51] Int. Cl.$^5$ .................. C08G 63/62; B01J 21/20; B01J 21/02
[52] U.S. Cl. ....................... 528/405; 502/28; 502/170
[58] Field of Search ............ 502/28, 24, 170; 528/405

[56] References Cited

U.S. PATENT DOCUMENTS

| | | | |
|---|---|---|---|
| 3,585,168 | 6/1971 | Inoue et al. | 260/77.5 D |
| 3,900,424 | 8/1975 | Inoue et al. | 252/428 |
| 4,789,727 | 12/1988 | Sun | 528/405 |
| 4,851,507 | 7/1989 | Kesling, Jr. et al. | 528/405 |

FOREIGN PATENT DOCUMENTS

151116 12/1977 Japan.

OTHER PUBLICATIONS

"Organic and Bio-Organic Chemistry of Carbon Dioxide", Inoue and Yamazaki, pp. 167–176, John Wiley & Sons, New York (1982).

*Primary Examiner*—Paul E. Konopka
*Attorney, Agent, or Firm*—Mark L. Rodgers; William F. Marsh; James C. Simmons

[57] ABSTRACT

A process is provided for regenerating metallo-organic catalyst used in copolymerizing carbon dioxide with epoxides to form poly(alkylene carbonates). The catalyst is a polyvalent metal dicarboxylate and the regeneration procedure involves contacting spent or deactivated catalyst with dicarboxylic acid, preferably in a slurry. In one aspect the copolymerization is carried out and catalyst is separated from the polymerization mixture, reactivated with the dicarboxylic acid, such as glutaric or adipic acid, and reused in copolymerization to form poly(alkylene carbonate).

14 Claims, No Drawings

REGENERATION OF METALLO-ORGANIC CATALYST FOR CARBON DIOXIDE-EPOXIDE COPOLYMERIZATION

TECHNICAL FIELD

This invention relates to a method of regenerating catalysts which are polyvalent metal dicarboxylates and are useful in the copolymerzation of epoxides with carbon dioxide to form poly(alkylene carbonates). In another aspect the invention relates to a process for making poly(alkylene carbonates) by copolymerizing carbon dioxide with epoxides over a polyvalent metal dicarboxylate catalyst, in which the catalyst is recovered, reactivated and reused.

BACKGROUND OF THE INVENTION

It has been known for almost two decades that poly(alkylene carbonates) of relatively high molecular weight are useful in the manufacture of fibers, films, coatings, and molding compounds, and can be prepared by the copolymerization of epoxides with carbon dioxide using an organometal catalyst. This process, however, has not yet reached full commercial production, in part because of the costs involved relating to yield, which in turn is dependent upon catalyst activity, including the loss of activity of the catalyst during polymerization.

U.S. Pat. No. 3,585,168 to Inoue, et al. (1971) discloses copolymerizing epoxides and carbon dioxide using an organometallic catalyst, such as diethyl zinc, with a cocatalyst having an active hydrogen, such as water, alcohol or ketone. Epoxides disclosed include propylene oxide, ethylene oxide, styrene oxide, isobutylene oxide and epichlorohydrin. The polycarbonates formed have substantially equal molecular ratios of carbon dioxide and epoxide and have molecular weights on the order of 10,000 to 200.000.

U.S. Pat. No. 3,900,424, Inoue, et al. (1975) describes how to improve an organometal catalyst for copolymerizing carbon dioxide and epoxy compounds by pretreating the catalyst with carbon dioxide. Neither the '168 nor the '424 patents, however, deal with the problem of reusing the catalyst in subsequent polymerization reactions.

Japanese patent disclosure 1977-(Sho 52)-151,116. Inoue, et al. (1977) describes metal carboxylates which are useful as catalysts in the homopolymerization of epoxides or copolymerization of epoxides with carbon dioxide. These catalysts contain di-, tri- or tetravalent metals or Group VIII transition metals as salts of both dicarboxylic and monocarboxylic acids, with at least two monocarboxylate groups in terminal positions in the molecule of the catalyst compound. Following polymerization, monocarboxylic acid can be added to aid in separating the catalyst for reuse. Any residual free carboxylic acid in the catalyst is said to inhibit polymerization activity.

Inoue and Yamazaki, *Organic and Bio-Organic Chemistry of Carbon Dioxide* pages 167–176, John Wiley & Sons New York (1982) discusses the copolymerization of carbon dioxide with epoxides and surveys several effective catalyst systems, including combinations of diethyl zinc with an aromatic dicarboxylic acid, but does not deal with the problems of recovering and reactivating spent catalyst.

SUMMARY OF THE INVENTION

We have discovered that solid metallo-organic compounds which are polyvalent metal dicarboxylates useful as catalysts in the copolymerization of carbon dioxide and epoxides can be regenerated by contacting the recovered catalyst from the polymerization process with dicarboxylic acid and then removing excess acid from the catalyst. In a preferred procedure for our reactivation process, the catalyst used for the copolymerization of carbon dioxide and epoxide is one which has been formed by reacting dicarboxylic acid and a polyvalent metal oxide, hydroxide, alkoxide or organic acid salt. In this procedure the spent catalyst is separated from the reaction mixture of the copolymerization and used to form a slurry of catalyst in a solution or suspension of a dicarboxylic acid of the type used in forming the original catalyst. This solution or suspension can be made using any non-deleterious solvent or liquid suspending medium, such as ethanol or hexane. The slurry is heated and agitated in order to obtain thorough contact between the catalyst and the dicarboxylic acid in the liquid medium, following which the contacted catalyst is removed from the slurry and any excess dicarboxylic acid is separated from the regenerated catalyst.

In a further aspect of our invention, a process is provided for copolymerizing carbon dioxide with an epoxide to form a poly(alkylene carbonate) using a catalyst formed from a dicarboxylic acid and a polyvalent metal oxide, hydroxide. alkoxide or organic acid salt. In this copolymerization the catalyst is contacted with carbon dioxide and an epoxide, such as ethylene oxide, or propylene oxide, under copolymerization conditions in a reaction zone, and at least a portion of the catalyst is removed from the reaction zone when the catalyst has an activity which is less than that of the freshly formed catalyst prior to use in the polymerization. The removed catalyst is also separated from any accompanying material such as solvent and reaction product of the reaction zone, and then the catalyst is contacted with a dicarboxylic acid of the type used to form the catalyst originally, the dicarboxylic acid being either dissolved in a suitable solvent or suspended in a non-deleterious liquid. The contacted catalyst is then separated from excess dicarboxylic acid to form a regenerated catalyst and this regenerated catalyst is again contacted with carbon dioxide and epoxide under copolymerization conditions in order to form poly(alkylene carbonate).

DETAILED DESCRIPTION OF THE INVENTION

Very effective catalysts for the copolymerization of carbon dioxide and epoxides to form poly(alkylene carbonates) can be prepared by reacting dicarboxylic acids with polyvalent metal compounds such as oxides, hydroxides, alkoxides or organic acid salts. These metallo-organic compounds contain divalent metals, such as zinc, magnesium, calcium, cadmium, barium, manganese, and the like; trivalent metals, such as aluminum, boron, and the like; tetravalent metals, such as tin, silicon, titanium, and the like, or transition metals of Group VIII of the periodic table such as cobalt, nickel and the like. These metallo-organic dicarboxylates are formed by reacting the metal in the form of a metal oxide, for example, zinc oxide, or metal hydroxide, alkoxide or a metallic salt of an organic acid with a dicarboxylic acid which can be any dicarboxylic acid useful in preparing such catalysts, including aromatic and aliphatic, dibasic or dicarboxylic acids having from 2 to 10 carbon atoms, such as phthalic acid, isophthalic acid, terephthalic acid, maleic acid, fumaric acid, glutaric acid, adipic acid and the like.

The catalysts are used by contacting them under copolymerization conditions of a moderately elevated temperature and a carbon dioxide pressure with an epoxide in a suitable solvent as described in the cited patents of Inoue, et al. These catalysts, however, after a cycle or two of polymerization, lose a significant amount of activity, apparently because of poisoning of the active sites. This activity loss has an adverse impact on the overall process economics.

Attempts have been made to reactivate these catalysts using standard techniques such as heat treating, solvent washing, or grinding in order to increase or restore catalytic activity. In these attempts, catalyst was washed with fresh solvent in order to remove any occluded polymer. The catalyst was ground, both in the presence and absence of solvents, in order to expose fresh active sites on the catalyst surface. Neither of these attempts was successful in restoring complete activity to the catalyst.

It was discovered that the catalyst could be reactivated by separating it from the reactor contents using either filtration or centrifugation, and then drying the isolated catalyst to remove any remaining solvent. The isolated catalyst is then used to form a slurry with a dicarboxylic acid, which preferably corresponds to that used or is of the same type or similar to the dicarboxylic acid used in originally forming the catalyst. In other words, the regeneration acid has a chemical formula which is the same as or is similar to the formula for the acid used to make the catalyst in the beginning. This acid is in a solution or suspension in a non-deleterious solvent or suspending liquid, such as ethanol, methanol, hexane, toluene or other medium which will not adversely affect the catalyst. The slurry is stirred and heated to a temperature which can range from ambient temperature to about 100° C. or higher, preferably about 25° to 65° C., for a period of time which can range from a few minutes to several hours, for example, about one to four hours is useful. The catalyst, after being thoroughly contacted with the dicarboxylic acid, is then removed from the slurry by filtration or other means such as centrifugation and washed repeatedly with a solvent for the dicarboxylic acid, such as a polar organic solvent, for example, methanol, ethanol, and the like, in order to remove excess acid. Washing is continued until the catalyst is substantially free of excess dicarboxylic acid. Following such washing the solid material is dried, preferably in a vacuum at an elevated temperature below the catalyst decomposition temperature, for example about 60° C. up to about 200° C., for several hours until the catalyst is essentially free of solvent, typically about 8 hours.

The catalyst slurry can contain anywhere from 1 to 50 wt. % catalyst solids, but it is preferred to operate with about 5 to 15 wt. % solids for most efficient contact with the dicarboxylic acid. The amount of dicarboxylic acid in the liquid medium should be at least about 1 wt. % based upon the liquid solvent or suspending medium. The upper limit is controlled by practical contacting considerations and for solutions is the limit of solubility of the acid. It is preferred to operate with a concentration of about 10 to 20 wt. % acid in the liquid medium, either as a solution or suspension. A typical process would include about 7 wt. % catalyst slurried in about 15 wt. % of the appropriate acid in ethanol. While ethanol and methanol are quite suitable solvents, almost any liquid which does not adversely affect the catalyst can be used. Hexane and toluene are other examples of suitable non-deleterious liquid suspending media. Glutaric and adipic acids are particularly useful because of their good solubility in a variety of liquid media. Both the catalyst and dicarboxylic acids are finely divided solids, e.g. powders or crystals which can be used in the form in which the starting materials are available commercially. For example, the catalyst can have a particle size approximating that of commercially available zinc oxide powder. Slurry contacting is preferred for the regeneration steps, but other contacting methods can be used. For example, when using the dicarboxylic acid in solution, the catalyst can be placed in a fixed bed and the solution of dicarboxylic acid circulated through the bed, or the catalyst can be permitted to settle through a volume of acid solution.

In the examples, the polymerizations are carried out in sequential batch operations with the catalyst from a first polymerization being recovered, reactivated and then reused in a second polymerization. The invention can also be effectively operated on a commercial scale using a continuous process in which the polymerization reaction occurs in a single reaction zone and sufficient catalyst is removed either continuously or intermittently, regenerated as described, and then returned to the reaction zone in order to maintain a desirable average level of catalyst activity for the copolymerization.

The catalyst treatment which has been described restores the catalyst to its original activity level and allows it to be reused in further polymerization cycles, thereby greatly decreasing the overall catalyst consumption and the cost of operating the process. Although we are not to be bound by theory, it is believed that this treatment technique operates through the regeneration of surface catalyst sites and it is also possible that fresh carboxylic acid residues are incorporated on the catalyst surface. Apparently the regeneration does not operate in the same manner as traditional regeneration approaches, since solvent washing, heat treating and grinding were tried without success. Solvent washing was performed on the assumption that the catalyst sites may have been fouled by deposits of polymeric material. However, with repeated washing using appropriate solvents the catalyst activity was not restored. Heat treating was also performed in the belief that any polymer residues might be volatilized from the catalyst surface. This was unsuccessful. Catalyst particle size is often related to activity and when particle agglomeration occurs, catalyst activity generally drops. Attempts were made to reactivate the catalyst by grinding both in the presence and absence of solvents, but all such attempts were unsuccessful in regenerating an active material. It is believed, therefore, that active catalyst sites in this copolymerization are actually lost or poisoned during the copolymerization process and treatment with the dicarboxylic acid appears to regenerate such sites incorporating fresh organic acid residues into the catalyst and thereby restoring its activity.

The following examples further illustrate the invention:

CATALYST PREPARATION

EXAMPLE 1

A solution of 100 g glutaric acid in 400 ml methanol was slowly added to a stirred slurry of 50 g zinc oxide in 350 ml methanol. Upon completion of the acid addition, stirring was maintained and the mixture was heated to 60° C. and held for four hours. The solids were removed by filtration, washed twice with 500 ml methanol, and dried in vacuum at 60° C. for twelve hours. The product yield was 106 g and zinc content was 33.7 weight percent.

EXAMPLE 2

Catalyst was prepared as in Example 1 except ethanol was used instead of methanol. Product yield was 104.2 g and zinc content was 36.2 weight percent.

EXAMPLE 3

A solution of 180 g adipic acid in 400 ml hot (70° C.) ethanol was slowly added to a stirred, heated (70° C.) slurry of 100 g zinc oxide in 400 ml ethanol. Upon completion of the acid addition, stirring was continued and temperature was maintained at 70° C. for four hours. The solids were removed by filtration, washed twice with 500 ml hot ethanol, and dried in vacuum at 60° C. for twelve hours. Product yield was 217 g and zinc content was 33.5 weight percent.

EXAMPLE 4

Zinc oxide (50 g) and glutaric acid (73 g) were added to 600 ml toluene and the slurry was stirred at ambient temperature for two hours. The slurry was then heated to reflux (105° C.) and maintained for four hours. The solvent was removed by vacuum evaporation at 50° C. Zinc content of the product was 35.4 weight percent.

Examples 1-4 illustrate methods of preparing the original catalyst which can be used to copolymerize epoxides and carbon dioxide and then be regenerated and reused.

POLYMERIZATION AND REUSE OF CATALYST

EXAMPLE 5

Zinc oxide/glutaric acid catalyst (12 g), prepared as described in Example 1, was charged to a clean, dry one-liter reactor. The reactor and catalyst were placed in a drying oven and heated to 150° C. for four hours. After cooling, the reactor was loaded with 140 ml propylene oxide monomer and 260 ml methylene chloride solvent and sealed. The reactor was pressure tested with $N_2$ to 1000 psig. vented, and pressurized with $CO_2$ to 200 psig. The reactor was stirred (600 rpm) and heated to 85° C. A valve was opened to maintain 450 psig $CO_2$ pressure. After four hours, the reactor contents were vented through a dip tube. Product yield was 47.6 g or 23.8 percent.

EXAMPLE 6

Catalyst (11.0 g) from the run of Example 5 was removed from the polymerizate by filtration and centrifugation, washed with methylene chloride, and dried in vacuum at 60° C. for twelve hours. After crushing in a mortar and pestle, the catalyst was placed in the reactor and the polymerization procedure of Example 5 was repeated. Product yield was 35.7 g or 17.5 percent.

EXAMPLE 7

Catalyst (9.7 g) from the run of Example 6 was isolated as in Example 6, replaced in the reactor, and the polymerization procedure of Example 5 was repeated. Product yield was 2.9 g or 1.4 percent.

EXAMPLE 8

Catalyst (9.3 g) from the run of Example 7 was isolated as in Example 6, replaced in the reactor, and the polymerization procedure of Example 5 was repeated. Product yield was 2.4 g or 1.2 percent.

EXAMPLE 9

Catalyst (8.8 g) from the run of Example 8 was isolated as in Example 6, replaced in the reactor and the polymerization procedure of Example 5 was repeated. Product yield was 4.95 g or 2.43 percent.

Examples 5-9 illustrate repeated use of a zinc dicarboxylate catalyst to copolymerize propylene oxide and carbon dioxde to form a poly(propylene carbonate) product. Catalyst activity declined steadily to Examples 8 and 9. Crushing the catalyst (Example 6) did not restore activity to its original level.

CATALYST TREATMENT

EXAMPLE 10

Catalyst (5.6 g) from the run of Example 9 was isolated as in Example 6 and treated with glutaric acid. Spent catalyst was added to 100 ml of 1.5 M glutaric acid in ethanol. The mixture was stirred, heated to 60° C., and held for four hours. The solids were removed by filtration, washed twice with 100 ml ethanol, and dried in vacuum at 60° C. for 12 hours. The polymerization procedure of Example 5 was repeated using the treated catalyst. Product yield was 28.8 g or 56.5 percent.

Example 10 illustrates the effect of regenerating the spent zinc dicarboxylate catalyst by treating it with a dicarboxylic acid, glutaric acid, according to the invention. The restored activity was as high or higher than the activity of the original catalyst.

Additional aspects and embodiments of our invention will be apparent to those skilled in the art without departing from the spirit or scope thereof.

We claim:

1. A method of regenerating solid metallo-organic catalyst for the copolymerization of carbon dioxide and epoxides, said catalyst being a polyvalent metal dicarboxylate, which comprises contacting said catalyst recovered from a polymerization process with a regenerating amount of dicarboxylic acid under regenerating conditions of time and temperature, and then removing excess acid from the catalyst.

2. The method of claim 1 wherein said catalyst is a product formed by reacting zinc oxide and a dicarboxylic acid.

3. The method of claim 2 wherein the dicarboxylic acid used to contact the recovered catalyst has the same chemical formula as the dicarboxylic acid used to form said catalyst.

4. The method of claim 2 wherein said dicarboxylic acids are selected from aromatic and aliphatic dibasic acids having from 2 to 10 carbon atoms.

5. The method of claim 3 wherein said dicarboxylic acids are glutaric or adipic acids.

6. A process for reactivating spent solid catalyst from copolymerization of carbon dioxide and epoxide, said catalyst having been formed by reacting dicarboxylic acid and polyvalent metal oxide, hydroxide, alkoxide or organic acid salt, comprising (a) separating said spent catalyst from the reaction mixture of said copolymerization;

(b) forming a slurry of said catalyst in a liquid medium containing a regenerating amount of dicarboxylic acid of the type used in forming the catalyst originally;

(c) heating and agitating said slurry under regenerating conditions of time and temperature to obtain thorough contact between said catalyst and said dicarboxylic acid in said liquid medium;

(d) removing the contacted catalyst from said slurry; and (e) removing any excess dicarboxylic acid from said catalyst.

7. The process of claim 6 wherein said slurry contains 1 to 50 weight percent catalyst solids.

8. The process of claim 6 wherein said liquid medium contains at least one weight percent dicarboxylic acid.

9. The process of claim 6 wherein said slurry contains 5 to 15 weight percent catalyst solids and said liquid medium contains 10 to 20 weight percent dicarboxylic acid.

10. The process of claim 6 wherein said slurry is at a temperature of about 25° to 100° C. and agitated for about one to four hours.

11. The process of claim 6 wherein said contacted catalyst removed from said slurry is washed with ethanol to remove excess acid and dried at subatmospheric pressure with heating.

12. A process for copolymerizing carbon dioxide and epoxide with solid catalyst formed from a dicarboxylic acid and a polyvalent metal oxide, hydroxide, alkoxide or organic acid salt, comprising (a) contacting said carbon dioxide and epoxide with said catalyst under copolymerization conditions in a reaction zone;

(b) removing at least a portion of said catalyst from said reaction zone, the catalyst thus removed having an activity less than freshly formed catalyst prior to said contacting step;

(c) separating the removed catalyst from any accompanying reaction zone materials;

(d) contacting said removed catalyst with a regenerating amount of dicarboxylic acid of the type used to form said catalyst originally, in a non-deleterious liquid medium and under regenerating conditions of time and temperature;

(e) separating contacted catalyst of step (d) from excess dicarboxylic acid to form a regenerated catalyst; and (f) contacting said regenerated catalyst with carbon dioxide and epoxide under copolymerization conditions.

13. The process of claim 12 wherein each of steps (a) and (f) are batch operations and substantially all of the catalyst from step (a) is regenerated for reuse in step (f).

14. The process of claim 12 wherein steps (a) and (f) occur in a single reaction zone for a continuous process and sufficient catalyst is removed and separated in steps (b) and (c) either continuously or intermittently, regenerated in steps (d) and (e), and returned to said reaction zone in order to maintain a desired average level of catalyst activity for the copolymerization.

* * * * *